United States Patent [19]

Etemad et al.

[11] Patent Number: 5,022,834

[45] Date of Patent: Jun. 11, 1991

[54] SCROLL COMPRESSOR WITH ENHANCED DISCHARGE PORT

[75] Inventors: Shahrokh Etemad, Stratford, Conn.; Donald Yannascoli, Manlius, N.Y.; Howard H. Fraser, Jr., Lafayette, N.Y.; William R. Lane, Dewitt, N.Y.

[73] Assignee: Carrier Corporation, Syracuse, N.Y.

[21] Appl. No.: 466,068

[22] Filed: Jan. 16, 1990

[51] Int. Cl.[5] ........................ F04C 18/04; B23B 35/00; B23P 13/02

[52] U.S. Cl. .............................. 418/55.1; 29/888.022; 408/1 R

[58] Field of Search ............................ 418/55.1, 55.2; 29/888.022; 408/1 R

[56] References Cited

U.S. PATENT DOCUMENTS 4,464,100 8/1984 Machida et al. .................. 418/55.1

FOREIGN PATENT DOCUMENTS 60-141411 7/1985 Japan ................................ 408/1 R
60-230585 11/1985 Japan ................................ 418/55.2
61-288906 12/1986 Japan ................................ 408/1 R
63-215891 9/1988 Japan ................................ 418/55.1

*Primary Examiner*—John J. Vrablik

[57] ABSTRACT

A scroll compressor has a pair of mating scrolls that are disposed on parallel, eccentric axes, and each of these scrolls has a scroll plate and a spiral, involute wrap. The scrolls are driven so that one of them orbits about the axis of the other scroll while maintaining a fixed azimuthal relationship to it. The orbital motion causes a compressible fluid to enter at the periphery of the scrolls, and be carried and compressed by pockets formed between the mating wraps of these scrolls. The compressed gas is discharged out a discharge port at the center of one of the scrolls. The discharge port is bored diagonally into the scroll plate of the one scroll so that it has an elongated elliptical aperture at the center of the scroll plate. The port is machined into the scroll from the wrap side of the scroll. The enlarged size of the port aperture reduces the resistance to fluid flow and hence reduces the back pressure, thereby increasing the compressor efficiency.

5 Claims, 1 Drawing Sheet

SCROLL COMPRESSOR WITH ENHANCED DISCHARGE PORT

BACKGROUND OF THE INVENTION

This invention relates to rotating pumps or compressors of the scroll type, and is more particularly directed to a scroll type compressor having an improved high-pressure port at the center of one of the scrolls.

Scroll type compressors have been known, in principle, for several decades. In general, a scroll-type compressor or similar machine comprises a pair of mating scrolls, which have involute spiral wraps of similar shape, mounted on respective base plates. Normally, one scroll is held fixed, and the other is orbited to revolve, but not rotate, being held by an Oldham ring or other anti-rotating structure. In some versions both scrolls rotate synchronously on eccentric shafts. The walls of the two involute wraps define crescent-shaped volumes which become smaller and smaller and move from the outside to the center of the mating scrolls as the orbiting scroll revolves. A compressible fluid, such as a refrigerant gas, can be introduced at the periphery of the spiral wraps, and is compressed as it is moved under the orbiting motion of the device. The compressed fluid is then discharged through an opening or port at the center. By introducing a compressed fluid at the center and permitting its expansion to drive the device, the scroll machine can be used as a motor.

In a conventional scroll compressor, the discharge port, which is machined through the stationary scroll, is circular in shape and is limited in diameter by the geometry of the scroll itself. The small-size discharge port can act as an orifice or restriction and reduce output pressure due to its resistance to fluid flow. One attempt to increase the discharge port diameter is described in U.S. Pat. No. 4,498,852, an oversize hole is bored through the fixed scroll at its center. That hole has to be machined in from the back, i.e., the side opposite the wrap. Consequently, manufacture involves additional manufacturing steps of inverting and accurately positioning the scroll. Because the oversize hole is bored partly into the spiral wrap, the wrap wall is weakened at the center, where gas pressure is highest. Also, the thin remaining wrap wall at this point leaves only a small margin for machining error. This fact, coupled with the problems inherent in drilling through from the back, can lead to a significant scrap rate for this design.

OBJECTS AND SUMMARY OF THE INVENTION

It is an object of this invention to provide a scroll compressor of improved design which avoids the drawbacks of the prior art.

It is a more specific object of this invention to provide a high pressure discharge port which is generally elongated to reduce fluid impedance through the port, but which can be manufactured readily and accurately without requiring additional process steps.

It is another object to provide a scroll compressor with a discharge port of increased area without damage to the scroll compression surfaces.

In accordance with an aspect of this invention, a scroll compressor has a pair of mating scrolls that are disposed on parallel but eccentric axes. Each has a scroll plate or disk, and a spiral or involute wrap that extends towards the other scroll from a face surface of the scroll plate. An electric motor drives the pair of scrolls in an orbiting motion, that is, with one of the scrolls orbiting about the axis of the other scroll while maintaining the one scroll on a fixed azimuth relative to the other scroll. In a preferred embodiment one of the scrolls is fixed in the compressor and the other scroll is driven by an eccentric crank but is held against rotation by an anti-rotation mechanism such as an Oldham ring. Alternatively, both scrolls can be driven to rotate in synchronism on their respective axes. A refrigerant gas or other compressible fluid is drawn into the mating pair of scrolls at their periphery. The fluid is captured into pockets that move towards the center and shrink in size by orbiting action, and the fluid is compressed until the fluid reaches the center of the scrolls.

A high-pressure discharge port is provided in one of the scrolls, e.g., at the center of the fixed scroll, and discharges the compressed fluid into a reservoir. From there, the compressed fluid continues, for example, to a condenser of a refrigeration or air conditioning unit.

In order to increase the size of the opening from the center of the face surface into the high-pressure port, and hence to reduce resistance to flow and increase efficiency, the opening is provided as an ellipse or oval. This can easily be done by boring the discharge port on a diagonal at a predetermined angle to the axis, so that the aspect of the port on the scroll plate surface is elliptical. The port can be diagonally bored by a machine tool from the wrap side. This avoids any need to invert the scroll and relocate it prior to machining. The discharge port can also be bored so as not to damage critical compression surfaces, i.e., the wall of the wrap.

The above and other objects features and advantages of this invention will become apparent from the ensuing description of a preferred embodiment which is to be read in connection with the accompanying Drawing.

DETAILED DESCRIPTION OF THE PREFERRED EMBODIMENT

Figure 1:
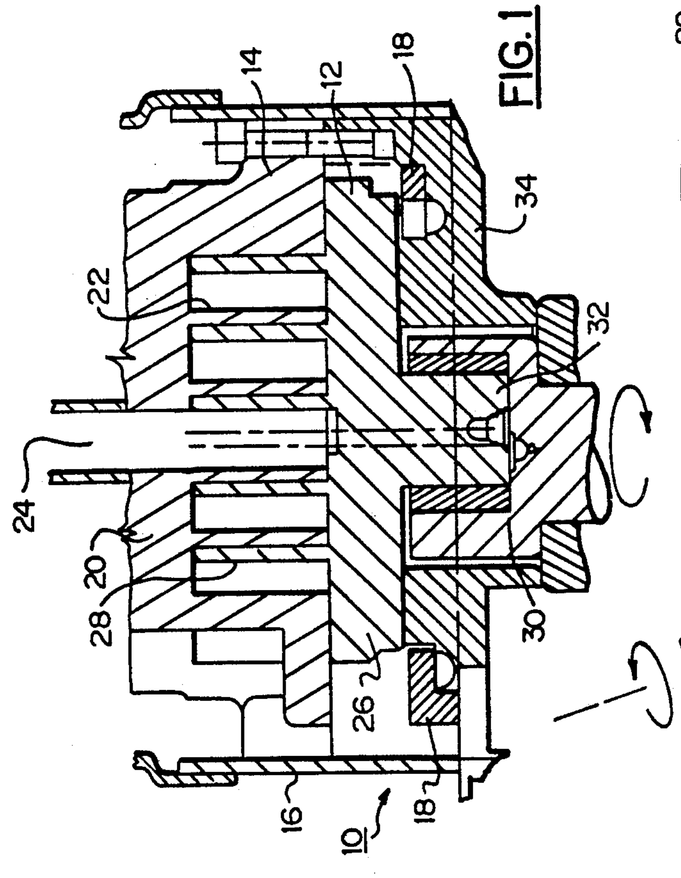
FIG. 1 is a partial sectional view of a scroll compressor according to an embodiment of this invention.

With reference to the Drawing, FIG. 1 shows an operative portion of a scroll compressor 10, in which there is a moving or orbiting scroll 12 that orbits about the axis of a fixed scroll 14. The fixed scroll 14 is firmly secured to an outer shell 16 of the compressor, and an anti-rotation device, to wit, an Oldham's ring 18, holds the moving scroll 12 against rotation, so that the two scrolls 12 and 14 maintain a constant azimuthal orientation relative to one another.

The fixed scroll 14 has a scroll plate or disk 20 on which there is a spiral or involute wrap 22. The wrap comprises a wall that is disposed erect on the plate 20, and spirals into a discharge port 24 at the center of the plate 20.

The moving or orbiting scroll 12 also is formed of a plate 26 on which there is a wrap 28 that is similar to the wrap 22, but inverted so that the two wraps 22 and 28 mate with one another. An eccentric drive crank 30 rotates to drive a male drive stub 32 of the orbiting scroll plate 26 when the crank 30 is rotated. The orbiting motion of the scrolls 12 and 14 forms crescent-shaped pockets or volumes, sometimes called lunettes, between the walls of the mating wraps 22 and 28. The orbiting motion moves these crescent shaped pockets from the periphery towards the center of the two scrolls, and causes the pockets to become smaller and smaller as they approach the center. In the compressor 10, the refrigerant gas enters the mating scrolls 12 and 14 at their periphery, and becomes trapped in these crescent shaped pockets. The pockets carry the gas towards the center of the disk and compress it; then the compressed gas is discharged out the discharge port 24.

Figure 2:
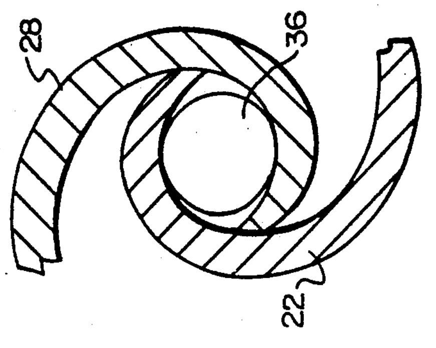
FIG. 2 PRIOR ART
FIGS. 2 and 3 are partial schematic plan views of the discharge port of a scroll compressor, according to the prior art.

The size of the discharge port 24 is one factor that can affect overall compressor performance. The discharge port area is typically formed simply by boring a circular hole at the center of the fixed scroll 14. As shown in FIG. 2, a typical discharge port 36 has a significantly smaller area than the oval cross-section of the pocket that is formed between the wraps 22 and 28 at the center. As mentioned previously, this circular discharge port 36 can present a resistance to flow of the compressed gas, and thus create a back pressure. This reduces the efficiency of the compressor.

Figure 3:
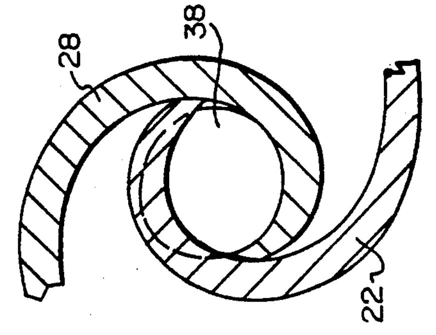
FIG. 3 PRIOR ART

An attempt to increase the area of the discharge port is illustrated in FIG. 3, in which a discharge port 38 is bored into the back of the fixed scroll plate 20. The process of forming this port also cuts part way into the fixed scroll wrap 22 at the center. While this does create a significantly larger aperture at the port 38, some of the material in the wall 22 is removed. This creates a weak point in the scroll wrap 22 at the point of highest gas pressure. Also, because the oversized port 38 is machined in from the reverse or back side of the scroll 14, manufacturing of the port requires the scroll work piece to be turned over and accurately relocated during manufacture. If the position of the inverted scroll is even slightly off tolerance, the port 38 can penetrate the wall 22, requiring the rather expensive workpiece to be scrapped.

Figure 4:
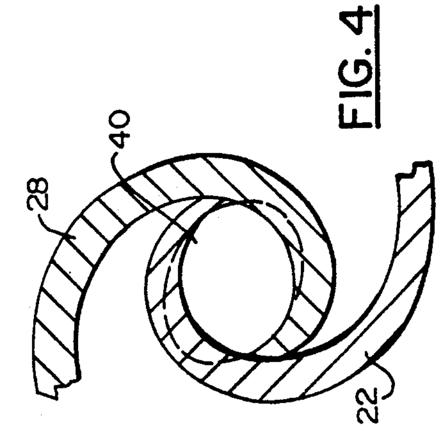
FIG. 4 is a schematic plan view of the scroll compressor discharge port according to an embodiment of this invention.
Figure 5:
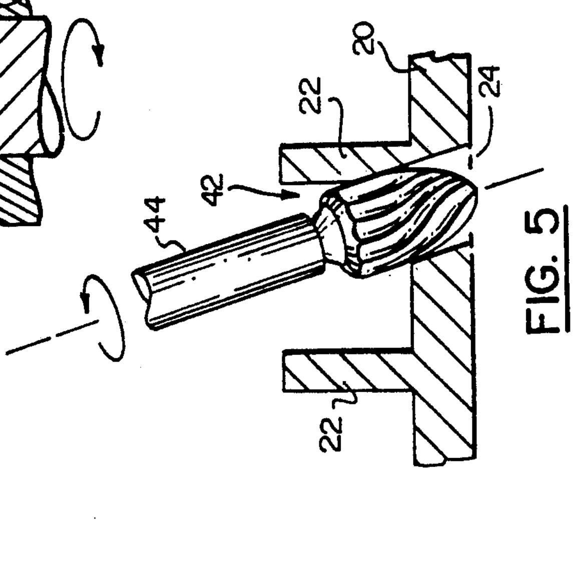
FIG. 5 is sectional view of a portion of the fixed scroll of a compressor, illustrating a method of forming of the discharge port according to one embodiment.

In this invention, an oval port 40 is created, as shown in FIG. 4, by drilling or machining a circular hole at an angle to the axis of the scroll 14, with the hole being machined from the front or wrap side of the scroll plate 20. This can be accomplished by simply tilting either the workpiece or the machining tool, and then proceeding to place the hole accurately at the center. As shown in FIG. 5, the port 24 can be machined using a boring tool 42 mounted on a rotary shaft 44. As shown, the boring tool 42 cuts the port 42 at an angle, through the face or wrap side of the plate 20. The tilt angle for the shaft 44 is selected based on desired geometry for the aperture 40. That is, the minor axis of the aperture 40, which will equal the diameter of the boring tool 42, is related to the major axis by the cosine of the tilt angle.

Figure 6:
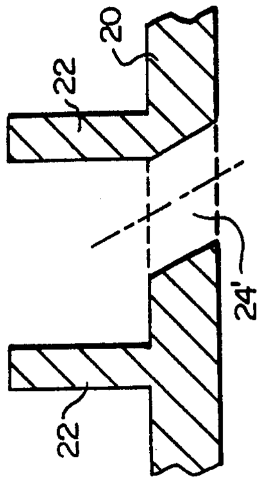
FIG. 6 is a sectional view showing the discharge port according to another embodiment.

In the arrangement shown in FIG. 5, the boring tool 42 cuts away a small part of the wrap 22 near the base at the plate 20. However, as shown in FIG. 6, a discharge port 24 can be bored through the plate 20 so that the elliptical aperture has its edge adjacent to the wall of the wrap 22, but does not cut into the wrap.

While the invention has been described in detail with reference to a preferred embodiment, it should be understood that the invention is not limited to that precise embodiment. Rather, many modifications and variations would present themselves to those skilled in the art without departing from the scope and spirit of this invention, as defined in the appended claims.

What is claimed is:

1. A scroll compressor of the type which comprises a pair of mating scrolls disposed on parallel eccentric axes, each of which includes a scroll plate and a spiral, involute wrap on a face surface of the scroll plate, and drive means for causing one of the scrolls to orbit about the axis of the other scroll while maintaining a fixed azimuthal relation to it, so that a compressible fluid enters the pair of scrolls at a periphery thereof, is carried and compressed in one or more pockets defined by the mating wraps of the scrolls as the one scroll orbits the other, and is discharged out a discharge port that is provided at the center of the scroll plate of one of said scrolls;

wherein the improvement comprises said discharge port being bored into the scroll plate of said one scroll diagonally with respect to the scroll axis so as to have an elongated elliptical aperture at the center of the surface of the scroll plate.

2. The scroll compressor according to claim 1 wherein said elliptical aperture has an edge extending adjacent to the wall of the wrap, but not into the wrap.

3. The scroll compressor according to claim 1 wherein said discharge port includes a diagonal bore formed from the face surface towards the back surface of the scroll plate.

4. A method of providing a discharge port at a center of a scroll for a scroll-type compressor of the type in which a pair of mating scrolls are disposed on parallel eccentric axes, and each said scroll includes a scroll plate and a spiral involute wrap on a face surface of the scroll plate, and in which drive means cause one of the scrolls to orbit about the axis of the other scroll while maintaining a fixed azimuthal relation to it, so that by the orbiting action of the scrolls a compressible fluid enters the pair of scrolls at a periphery thereof, and is carried and compressed in one or more pockets defined by the mating wraps of the scrolls, and is discharged out the discharge port that is provided at the center of the scroll plate of one of the scrolls, the method comprising boring said discharge port at said center at a predetermined angle to the axis of the scroll plate so that said discharge port has an elliptical aperture at the center of the face surface of the scroll.

5. The method of claim 4 wherein said step of boring is carried out by drilling from the face surface towards a back surface of the scroll plate.

* * * * *